US012583542B2

(12) United States Patent
Mingyan et al.

(10) Patent No.: US 12,583,542 B2
(45) Date of Patent: Mar. 24, 2026

---

(54) BICYCLE PARKING DEVICE

(71) Applicant: Hangzhou Canyu Technology Co, LTD., Hangzhou (CN)

(72) Inventors: Zhao Mingyan, Zhejiang (CN); Li Yixin, Zhejiang (CN)

(73) Assignee: Hangzhou Canyu Technology Co, Ltd., Hangzhou (CN)

( * ) Notice: Subject to any disclaimer, the term of this patent is extended or adjusted under 35 U.S.C. 154(b) by 526 days.

(21) Appl. No.: 18/337,357

(22) Filed: Jun. 19, 2023

(65) Prior Publication Data

US 2023/0331326 A1     Oct. 19, 2023

Related U.S. Application Data

(63) Continuation-in-part of application No. 16/675,556, filed on Nov. 6, 2019, now abandoned.

(30) Foreign Application Priority Data

Nov. 7, 2018    (CN) ......................... 201811317507.4

(51) Int. Cl.
B62H 3/08          (2006.01)
E04H 6/00          (2006.01)
          (Continued)

(52) U.S. Cl.
CPC ............... B62H 3/08 (2013.01); E04H 6/005 (2013.01); E04H 6/188 (2013.01); E04H 6/426 (2013.01)

(58) Field of Classification Search
CPC ....... B60S 13/02; B65G 1/045; B65G 1/0478; B66B 9/00; B66B 11/006; E04H 6/12;

E04H 6/28; E04H 6/282; E04H 6/285; E04H 6/287; E04H 6/422; E04H 6/18; E04H 6/188; E04H 6/22; E04H 6/225; E04H 6/24; E04H 6/245; E04H 6/36;
(Continued)

(56) References Cited

U.S. PATENT DOCUMENTS

| | | | |
|---|---|---|---|
| 2009/0301976 A1 | 12/2009 | Ayotte et al. | |
| 2015/0008237 A1 | 1/2015 | Mills et al. | |
| 2021/0189754 A1 | 6/2021 | Ikeda et al. | |

FOREIGN PATENT DOCUMENTS

| | | | | | |
|---|---|---|---|---|---|
| CN | 105692020 A | * | 6/2016 | ............. | B65G 1/045 |
| CN | 107060403 A | * | 8/2017 | ............. | E04H 6/005 |

(Continued)

OTHER PUBLICATIONS

English translation of EP 0394130 A1 (Year: 1990).*
(Continued)

*Primary Examiner* — Jeffrey A Shapiro
(74) *Attorney, Agent, or Firm* — Kunzler Needham & Hilton; Scott D. Thorpe

(57) ABSTRACT

For parking a bicycle, a bicycle parking device includes a storage tray, a lifting mechanism, and a rotary platform. The storage tray is located at the bottom of the bicycle parking device and has a plurality of bicycle parking spaces. The lifting mechanism drives a bicycle carrying platform to move up and down. The rotary platform that is rotatably disposed on the lifting mechanism and is docked with the bicycle parking space. The bicycle carrying platform transfers between the bicycle parking space and the rotary platform.

20 Claims, 6 Drawing Sheets

(51) Int. Cl.
E04H 6/18 (2006.01)
E04H 6/42 (2006.01)

(58) Field of Classification Search
CPC E04H 6/06; E04H 6/005; E04H 6/426; E04H
6/42; G07F 17/0057; G07F 17/244; B66F
7/04; B62H 3/08; B62H 2003/005; G06Q
30/0284
USPC .......................... 414/239, 240, 263; 700/238
See application file for complete search history.

(56) References Cited

FOREIGN PATENT DOCUMENTS

| | | | | | |
|----|---------------|------|---------|--------|------------|
| CN | 107806261 | A | | 3/2018 | |
| CN | 107939101 | A | | 4/2018 | |
| CN | 108222609 | A | * | 6/2018 | ............... E04H 6/28 |
| CN | 108374579 | A | | 8/2018 | |
| CN | 108412263 | A | | 8/2018 | |
| CN | 108756339 | A | | 11/2018 | |
| EP | 0394130 | A1 | * | 4/1990 | ............. E04H 6/282 |
| WO | 2016200029 | A1 | | 12/2016 | |

OTHER PUBLICATIONS

English translation of CN 108222609 A (Year: 2018).*
English translation of CN 107060403 A (Year: 2017).*
English translation of CN 105692020 A (Year: 2016).*
U.S. Appl. No. 16/675,556, "Office Action Summary", USPTO,
Sep. 1, 2022, pp. 1-30.
U.S. Appl. No. 16/675,556, "Office Action Summary", USPTO, Jan.
20, 2023, pp. 1-28.

\* cited by examiner 5-2

1-2

1-2-1

BICYCLE PARKING DEVICE

CROSS-REFERENCE TO RELATED APPLICATIONS

This is a continuation-in-part patent application that claims priority to claims priority to U.S. patent application Ser. No. 16/675,556 filed on Nov. 6, 2019, for Zhao Mingyan, the contents of which are incorporated by reference for all purposes, which claims priority to Chinese Patent Application No. 201811317507.4 filed on Nov. 7, 2018, for Zhao Mingyan, the entire contents of which are incorporated herein by reference for all purposes.

BACKGROUND INFORMATION

The invention relates to the technical field of public facilities, in particular to an underground public bicycle parking device. There may not be sufficient surface space bicycle parking.

DETAILED DESCRIPTION

Figure 1:
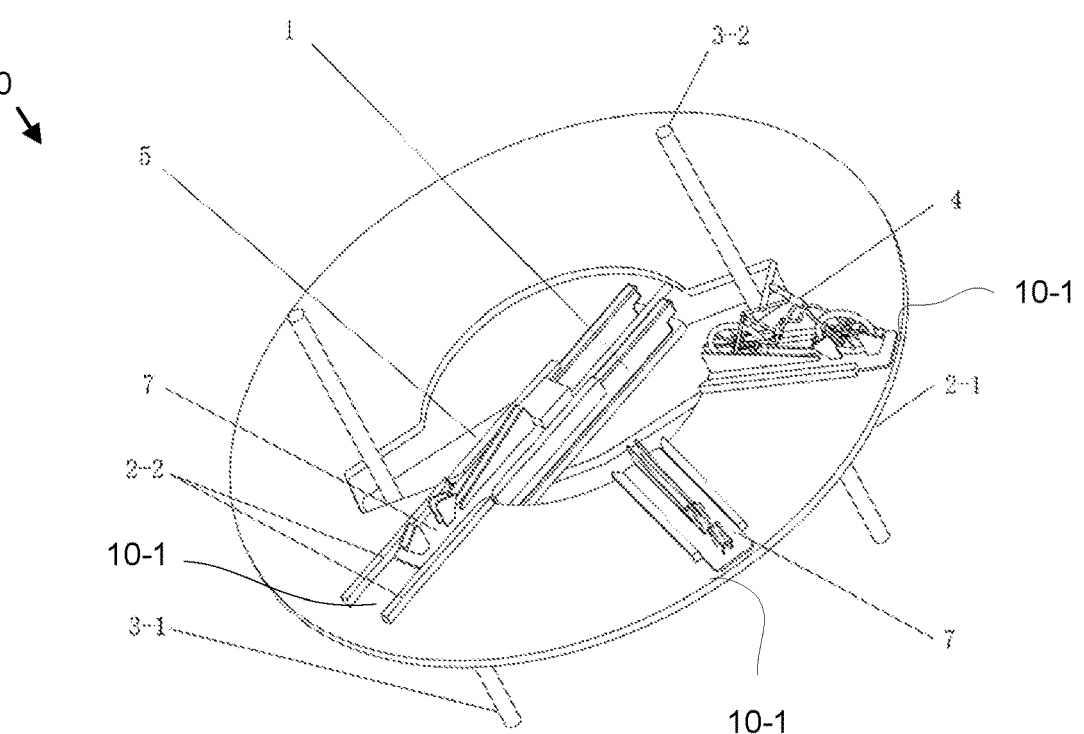
FIG. 1 is a perspective drawing illustrating one embodiment of a bicycle parking device.

China is the world's largest bicycle country, with more than 450 million bicycles. With the increasing number of shared bicycles, the problem of parking is becoming more and more serious. Provincial governments have to reduce the number of shared bicycles. In the past, the bicycle was mainly parked on the ground of a designated area. The parking has become a trouble in provincial development. On the one hand, it promotes green travel, while on the other hand, there are not enough suitable parking space for bicycles. One of the most important reasons is that the space location has not been effectively utilized, especially the use of underground space. If the space location can be effectively utilized, the parking problem of the bicycle can be alleviated.

With the advancement of urban green transportation infrastructure construction, many cities have built public bicycle sheds, using public parking pillar. However, as mentioned above, a large number of public bicycles occupy a large urban public space, or, due to space constraints, the layout of public bicycle spaces is limited, which is inconvenient to return the bicycle when the parking spaces are full.

In order to solve the problem, the embodiments park bicycles under the ground, so as to reduce the space occupied.

The underground public bicycle parking device includes:

A storage tray is located at the bottom of the bicycle parking device and has a plurality of bicycle parking spaces. A lifting mechanism that drives the bicycle carrying platform to move up and down to realize taken and parking of the bicycle. A rotary platform that is rotatably disposed on the lifting mechanism and is docked with the bicycle parking space by rotation. A bicycle carrying platform for parking the bicycle that transfers between the bicycle parking space and the rotary platform.

Optionally, an electronically controlled lock for locking the bicycle is disposed on the bicycle carrying platform. The electronically controlled lock is connected to the controller, and the controller detects the state of the electronically controlled lock and user data, and it is transmitted to the backend process. The backend process can count billable hours.

When user wants to park bicycle, the vacant bicycle carrying platform is placed on the rotary platform, and the lifting mechanism is raised to the ground. The bicycle is placed on the bicycle carrying platform. Subsequently the bicycle carrying platform which carrying the bicycle is lowered to the storage tray by the lifting mechanism. The rotary platform is rotated to dock with the corresponding vacant bicycle parking space, and the bicycle carrying platform on the rotary table is pushed into the bicycle parking space.

When the bicycle is taken, the bicycle carrying platform carrying the bicycle is brought into the rotating plate, and the bicycle is transported to the ground by the lifting mechanism.

Optionally, the lifting mechanism includes the first lifting screw, the second lifting screw and lifting platform. The first lifting screw and the second lifting screw are vertical setting. Both sides of the lifting platform respectively match up the first lifting screw and the second lifting screw. When the first lifting screw and the second lifting screw rotate, they drive the lifting platform up and down.

Optionally, the central part of the storage tray has an installation position, and the lifting mechanism is set at the installation position, and the lifting channel of the lifting mechanism is formed in the vertical direction of the installation position.

Optionally, the guide limit rail forms the bicycle parking space. The guide limit rail 2-2 can guide the bicycle carrying platform in and out and limit the bicycle carrying platform.

Optionally, the rotary platform includes rotating plate, translation screw, push block, supporting plate and guide board. The translation screw, push block and supporting plate are installed on the rotating plate. The translation screw through the push block. The guide board is set on the both sides of the rotating plate. The supporting plate coordinates with the bicycle carrying platform. The supporting plate is attached to the guide board and is located at the both sides of the push block. The translation screw rotates, so that the push block moves, and push bicycle carrying platform moves.

A push block and bicycle carrying platform form a detachable connection. The push block includes an electromagnet. The electromagnet may attract the bicycle carrying platform when the electromagnet is powered on. The contact parts of bicycle carrying platform and push block are made of magnetic materials.

Optionally, the bicycle carrying platform includes a bicycle placement plate, a front wheel-clamping structure and a rear wheel-clamping structure. The front wheel-clamping structure and the rear wheel-clamping structure are set in the bicycles placed plate.

Optionally, the storage tray is disk-shaped, and the bicycle parking space is distributed along the radial direction of the storage tray.

Compared with the prior art, the invention has the following advantages: the bicycle is parked in the underground space. And the device only needs to occupy the position of the rotary platform on the ground. The taking and parking of the bicycle may be completed by automated machinery, which reduces the occupation of the ground space. The device improves the space use ratio and alleviates the problem of city bicycle parking.

As shown in FIG. 1, the principal structure of the underground public bicycle parking device 10 is illustrated. The underground public bicycle parking device 10 comprises:

The storage tray 2-1 is located at the bottom of the bicycle parking device 10, and has a plurality of bicycle parking spaces 10-1;

The lifting mechanism 3 that drives a bicycle carrying platform 7 to move up and down.

The rotary platform 1 that is rotatably disposed on the lifting mechanism 3 and is docked with the bicycle parking space 10-1.

The bicycle carrying platform 7 transfers between the bicycle parking space 10-1 and the rotary platform 1 when parking a bicycle.

When user wants to park bicycle, the vacant bicycle carrying platform is placed on the rotary platform 1, and the lifting mechanism is raised to the ground. The bicycle is placed on the bicycle carrying platform 7. Subsequently the bicycle carrying platform 7 carrying the bicycle is lowered to the storage tray 2-1 by the lifting mechanism. The rotary platform 1 is rotated to dock with the corresponding vacant bicycle parking space 10-1, and the bicycle carrying platform 10-1 on the rotary platform 1 is pushed into the bicycle parking space 10-1.

When the bicycle is taken for use, the bicycle carrying platform 10-1 carrying the bicycle is brought into the rotary platform 1, and the bicycle is transported to the ground by the lifting mechanism.

The simulated public bicycle rental operation is as follows: A card reader or scanner is arranged on the ground portion of the device 10, and the card reader or scanner is connected with a backend process. When the user takes the bicycle, the user scans with the IC card or APP software. After obtaining the user information, the device 10 informs the backend process, and the backend process command is issued to control the corresponding bicycle carrying platform 7 to go up. After the user taking the bicycle, the controller learns the state of the electronic lock on the bicycle carrying platform, and then transmits the status information to the backend process. Billable hours is counted from the backend process, and then the vacant bicycle carrying platform 7 is sent to the bicycle parking space 10-1 in the underground space; when the bicycle is returned, the user still scans with the integrated circuit (IC) card or application (APP) software. The card reader or scanner obtains the user information and sends the user information to a backend process. The backend process has already stored the user's car rental information, so the backend process judges that the user is returning the bicycle. Therefore, the vacant bicycle carrying platform 7 starts to go up. The user places the bicycle on the bicycle carrying platform 7, and locks. The lock action can be dealt by manual or APP control.

The central part of the storage tray 2-1 has an installation position, and the lifting mechanism is set at the installation position, and the lifting channel of the lifting mechanism is formed in the vertical direction of the installation position.

A motor (not shown) drives the first lifting screw 3-1 and the second lifting screw 3-2 synchronous rotation, such that the lifting platform 5. The rotary platform 1 is placed on the lifting platform 5 and can be rotated. When the rotary platform 1 is aligned with the guide limit rail 2-2, the bicycle carrying platform 7 can be moved from the rotary platform 1 to the guide limit rail 2-2, thereby completing the storage operation. If the device 10 has multiple storage trays 2-1, the device 10 can park more bicycles. As shown in FIG. 1, the bicycle carrying platform 7 is moving from the track of the rotary platform 1 to the guide limit rail 2-2, and the guide limit rail 2-2 forms the bicycle parking space. The guide limit rail 2-2 can guide the bicycle carrying platform in and out and limit the bicycle carrying platform.

Figure 2:
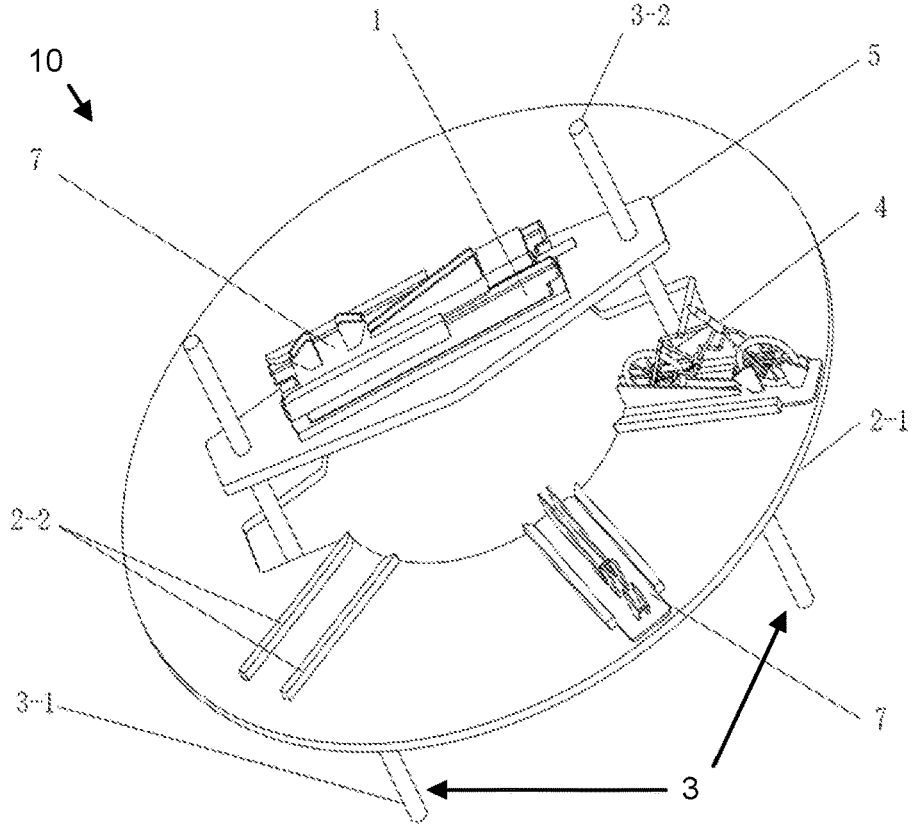
FIG. 2 is a perspective drawing illustrating one embodiment of a bicycle parking device lifting state.

As shown in FIG. 2, the lifting mechanism 3 is going up or down. When parking, the rotary platform 1 obtains a vacant bicycle carrying platform 7 from the storage tray 2-1. After the lifting mechanism 3 rises to the ground level, the bicycle is parked thereon. After the bicycle is taken, the vacant bicycle carrying platform 7 is lowered by the lifting mechanism 3, and the vacant bicycle carrying platform 7 is transferred from the rotary platform 1 to the storage tray 2-1.

Figure 3:
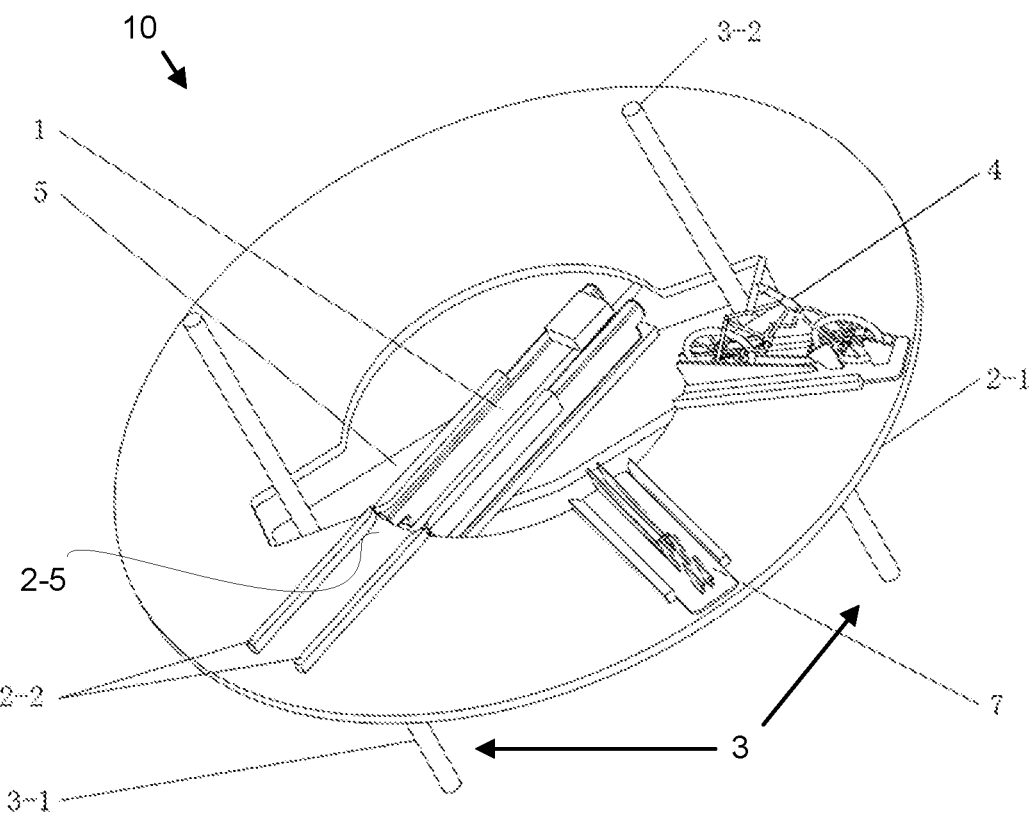
FIG. 3 is a perspective drawing illustrating one embodiment of a bicycle parking device with a rotatory platform docking with a bicycle parking space.

As shown in FIG. 3, the rotary platform 1 docks with bicycle parking spaces 10-1. The storage tray 2-1 is disk-shaped, and the bicycle parking space 10-1 is distributed along the radial direction of the storage tray 2-1. Bicycle can be arranged in a uniform arrangement. When the rotary platform 1 is docked with corresponding bicycle parking space 10-1, the rotary platform 1 and bicycle parking space 10-1 may transfer the bicycle carrying platform 7 to each other.

The lifting mechanism 3 includes the first lifting screw 3-1, the second lifting screw 3-2, and lifting platform 5. The first lifting screw 3-1 and the second lifting screw 3-2 are vertically disposed. Both sides of the lifting platform 5 respectively match up the first lifting screw 3-1 and the second lifting screw 3-2. When the first lifting screw 3-1 and the second lifting screw 3-2 rotate, they drive the lifting platform 5 up and down.

Figure 4:
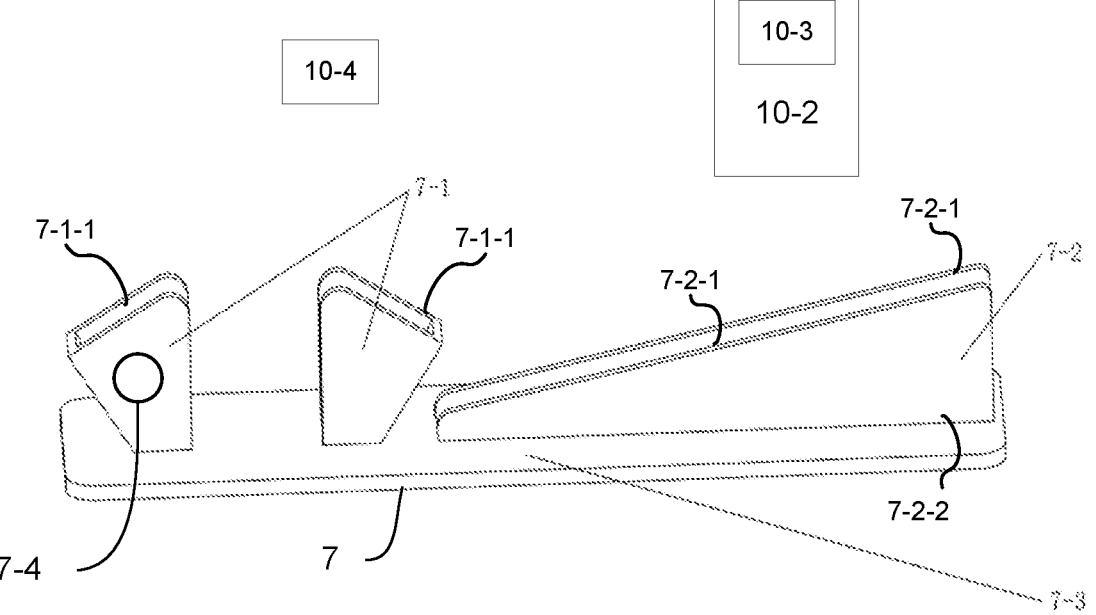
FIG. 4 is a perspective drawing illustrating one embodiment of a bicycle carrying platform.

As shown in FIG. 4, the bicycle carrying platform 7 is illustrated. The bicycle carrying platform 7 includes a bicycle placement plate 7-3, the front wheel-clamping structure 7-1 and the rear wheel-clamping structure 7-2. The front wheel-clamping structure 7-1 and the rear wheel-clamping structure 7-2 are connected to the bicycle placement plate 7-3. The front wheel-clamping structure 7-1 may include two restraining wells 7-1-1. The rear wheel-clamping structure 7-2 comprises two restraining walls 7-2-1. The restraining walls 7-2-1 are made of a ferrous material.

The restraining walls 7-2-1 connect to the bicycle carrying platform 7 at a connection seam 7-2-2. The connection seam 7-2-2 may be in the range of 50 to 100 centimeters (cm) in length. The length of the connection seam 7-2-2 forms a firm connection between the restraining walls 7-2-1 and the bicycle carrying platform 7 so that the push block may repeatedly motivate the bicycle carrying platform 7 without catastrophic wear to the connection seam 7-2-2.

An electric lock 7-4 for locking the bicycle is disposed on the bicycle carrying platform 7. The electric lock 7-4 is connected to a controller 10-2 and the controller 10-2 detects the state of the electric lock 7-4 and user data and transmits these to the backend process 10-4. The backend process 10-4 can count billable hours.

Figure 5:
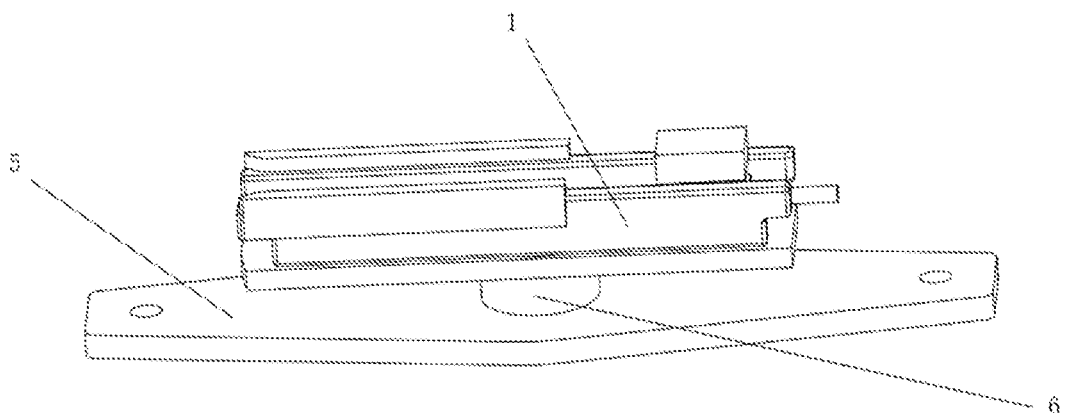
FIG. 5 is a perspective drawing illustrating one embodiment of a lifting platform coordinating with a rotary platform.

As shown in FIG. 5, the lifting platform 5 coordinates with the rotary platform 1. The rotary platform 1 is mounted on the lifting platform 5 via a rotary mechanism 6, and they can rotatably connect. The rotary mechanism 6 may be a rotating shaft in which bearing is disposed.

Figure 6:
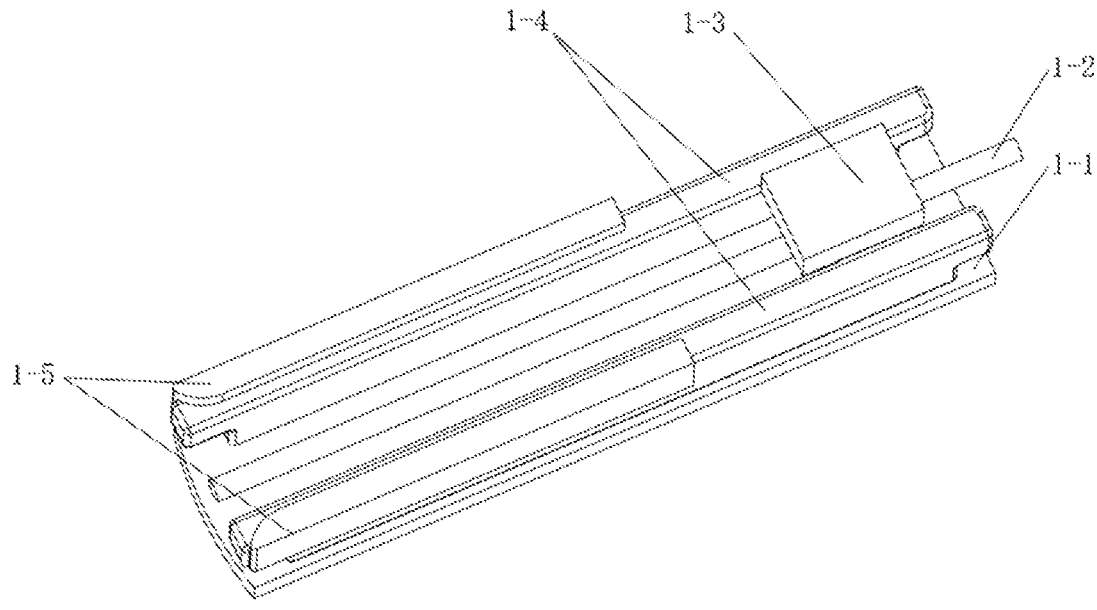
FIG. 6 is a perspective drawing illustrating one embodiment of a rotary platform.

As shown in FIG. 6, the rotary platform 1 is illustrated. The rotary platform 1 includes rotating plate 1-1, translation screw 1-2, push block 1-3, supporting plate 1-4 and guide board 1-5. The translation screw 1-2, push block 1-3 and supporting plate 1-4 are installed on the rotating plate 1-1. The translation screw 1-2 motivates the push block 1-3. The guide board 1-5 set on the both sides of the rotating plate 1-1. The supporting plate 1-4 coordinates with the bicycle carrying platform 7. The supporting plate 1-4 is attached to the guide board 1-5 and is located at the both sides of the push block 1-3. The translation screw 1-2 rotates, so that the push block 1-3 moves, and push bicycle carrying platform 7 moves.

The push block 1-3 on the rotary platform 1 and bicycle carrying platform 7 are detachably connected. The push block 1-3 includes an electromagnet. The electromagnet may attract the bicycle carrying platform 7 when the electromagnet powers on. By using an electromagnet to The contact parts of the bicycle carrying platform 7 and push block 1-3 may be made of magnetic materials.

Figure 7:
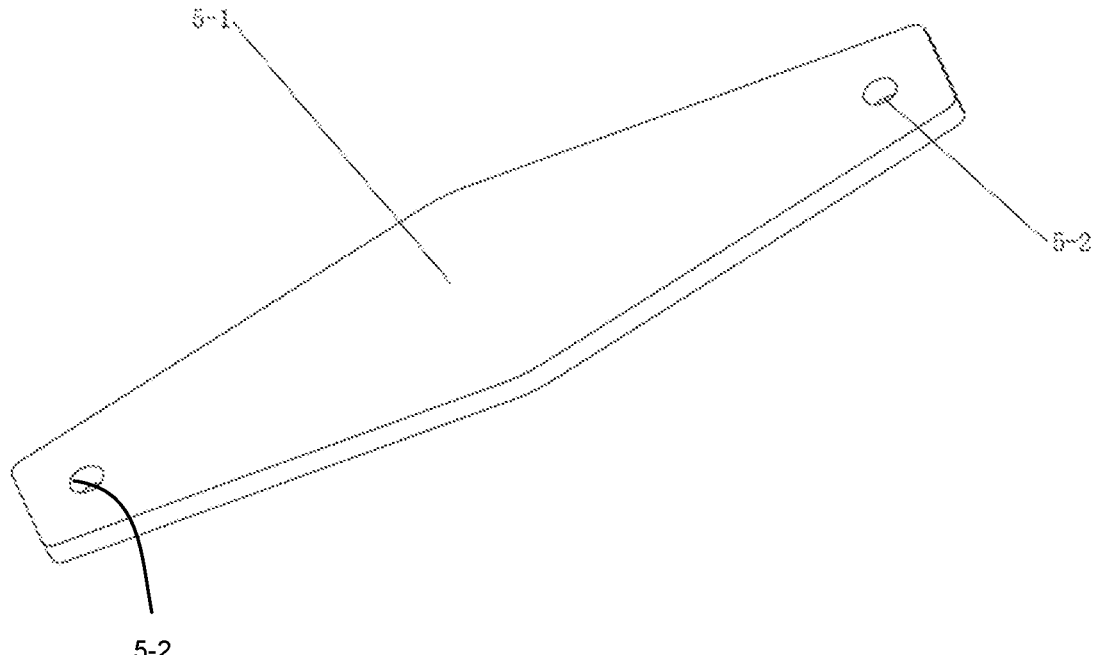
FIG. 7 is a perspective drawing illustrating one embodiment of a bottom plate of a lifting platform.

In FIG. 7, the bottom plate 5-1 of lifting platform 5 is illustrated. The lifting platform 5 comprises the bottom plate 5-1. Both sides of bottom plate 5-1 include one or more threaded holes 5-2. The threaded hole 5-2 may be motivated by the first lifting screw 3-1 and the second lifting screw 3-2.

Figure 8A:
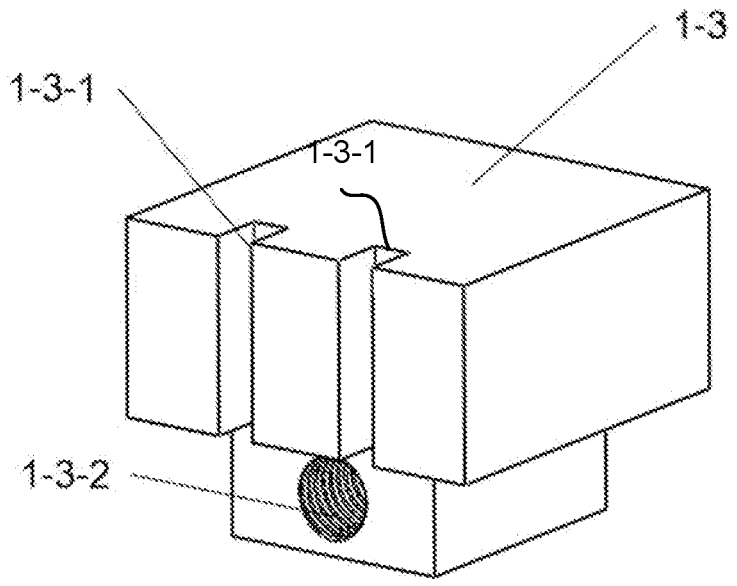
FIG. 8A is a perspective drawing illustrating one embodiment of a push block.

FIG. 8A is a perspective drawing illustrating one embodiment of a push block 1-3. In the depicted embodiment, the push block 1-3 includes a translation threaded hole 1-3-2. A rotation of the translation screw 1-2 motivates the push block 1-3.

The push block 1-3 comprises two mating groves 1-3-1. Each mating grove 1-3-1 may have a horizontal depth of 5 to 15 cm. Each mating grove 1-3-1 receives a restraining wall 7-2-1. An electromagnet is disposed in each mating grove 1-3-1. Each electromagnet attracts the corresponding restraining wall 7-2-1 and forms a detachable connection between interior sides of the mating grove 1-3-1 and the restraining wall 7-2-1 when powered on. The push block 1-3 pulls the bicycle carrying platform 7 using the detachable connection. The detachable connection may always end when power to the electromagnet is cut, resulting in no connection between the push block 1-3 and the restraining walls 7-2-1 and bicycle carrying platform 7. In contrast to mechanical detachable connections, the electromagnetic detachable connection does not fail to release or become stuck. As a result, the embodiments are protected from a mechanical failure to detach which typically results in a difficult maintenance operation.

The electromagnet may exert an attractive force in the range 100 to 400 Newtons (N). In a certain embodiment, the electromagnet exerts a force in the range of 150 to 250 N.

The mating groves 1-3-1 may protect the electromagnet 1-3-3 from accidental contact with ferrous surfaces. In addition, the mating groves 1-3-1 may constrain latitudinal forces when the push block 1-3 is pushing the restraining walls 7-2-1.

Figure 8B:
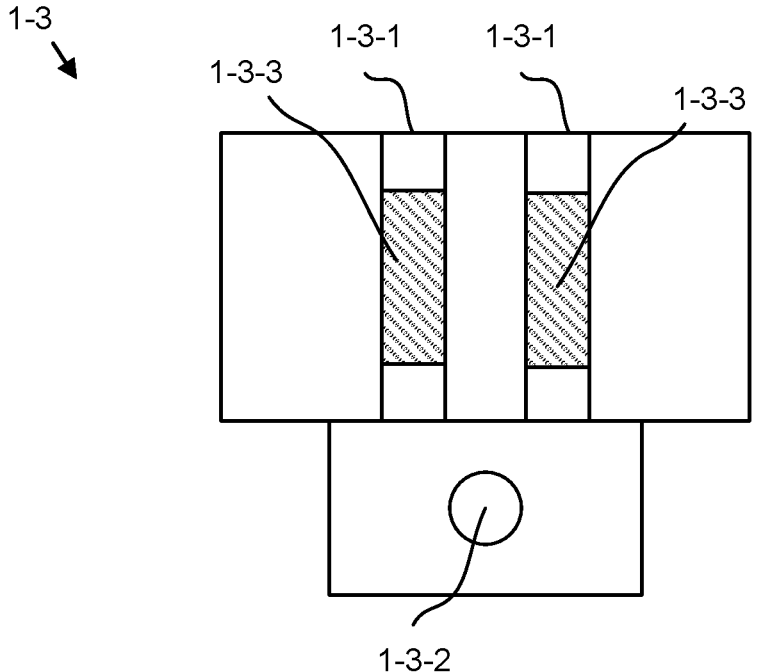
FIG. 8B is a side view drawing illustrating one embodiment of a push block.

FIG. 8B is a side view drawing illustrating one embodiment of a push block 1-3. The electromagnet 1-3-3 is shown disposed in the mating grove 1-3-1 to exert a longitudinal force. Alternatively, the electromagnet 1-3-3 may be disposed to exert a latitudinal force.

Figure 9:
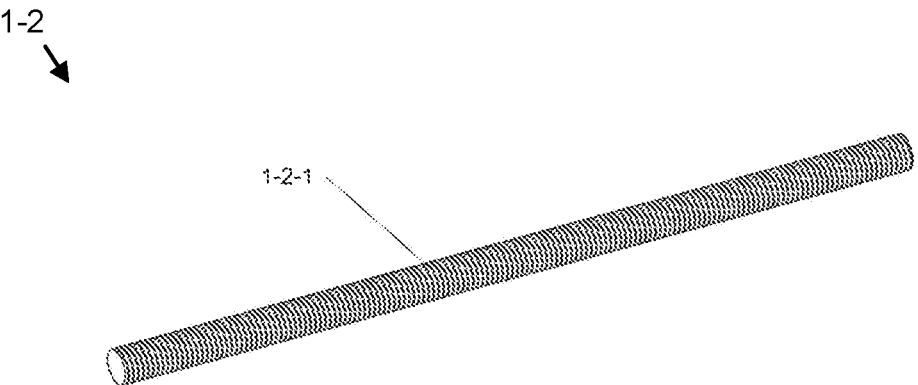
FIG. 9 is a perspective drawing illustrating one embodiment of a translation screw.

FIG. 9 is a perspective drawing illustrating one embodiment of a translation screw 1-2. The translation screw 1-2 includes a thread 1-2-1. The translation screw 1-2 rotates engaging the translation threaded hole 1-3-2 to move the push block 1-3 to pull the bicycle carrying platform 7 onto the rotary platform 1. In addition, the translation screw 1-2 rotates engaging the translation threaded hole 1-3-2 to move the push block 1-3 to push the bicycle carrying platform 7 off the rotary platform 1 and into a bicycle parking spaces 10-1 of the storage tray 2-1.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A bicycle parking device, including:
a storage tray located at the bottom of the bicycle parking device, and has a plurality of bicycle parking spaces;
a lifting mechanism that drives a bicycle carrying platform to move up and down;
the bicycle carrying platform comprises a front wheel-clamping structure, a rear wheel-clamping structure, and an electronic lock, the rear wheel-clamping structure comprising two restraining walls that restrain a rear bicycle tire from latitudinal movement and the electronic lock locking up the bicycle, wherein the two restraining walls are made of a magnetic material;
a rotary platform that is rotatably disposed on the lifting mechanism, and is docked with the bicycle parking space, the rotary platform comprises a rotating plate, a translation screw, a push block, a supporting plate and a guide board, wherein the translation screw, the push block and the supporting plate are installed on the rotating plate, the translation screw is threaded through a threaded translation hole of the push block, the guide board is set on the both sides of the rotating plate, the supporting plate coordinates with the bicycle carrying platform, the supporting plate is attached to the guide board, and is located at the both sides of the push block, and the translation screw rotates moving the push block, and wherein the push block comprises two mating groves that each receive a restraining wall, an electromagnet is embedded within each mating grove, wherein each electromagnet attracts the corresponding restraining wall and forms a detachable connection between interior sides of the mating grove and the restraining wall when powered on to form a detachable connection, the translation screw rotates to move the push block to pull the bicycle carrying platform onto the rotary platform; and
wherein the bicycle carrying platform transfers between the bicycle parking space and the rotary platform.

2. The bicycle parking device of claim 1, wherein the electromagnet exerts a force in the range of 150 to 250 Newtons.

3. The bicycle parking device of claim 1, where detachable connection ends when power to the electromagnet is cut.

4. The bicycle parking device of claim 1, wherein each mating grove 1-3-1 may have a depth of 5 to 15 centimeters.

5. The bicycle parking device of claim 1, wherein the lifting mechanism includes a first lifting screw, a second lifting screw and a lifting platform, the first lifting screw and the second lifting screw are vertical set, both sides of the lifting platform respectively match up the first lifting screw and the second lifting screw, and in response to the first lifting screw and the second lifting screw rotating, the first lifting screw and the second lifting screw drive the lifting platform up and down.

6. The bicycle parking device of claim 5, wherein a central part of the storage tray has an installation position, and the lifting mechanism is set at the installation position, and the lifting channel of the lifting mechanism is formed in the vertical direction of the installation position.

7. The bicycle parking device of claim 6, wherein a guide limit rail forms the bicycle parking space, the guide limit rail guides the bicycle carrying platform in and out of and limits the bicycle carrying platform.

8. The bicycle parking device of claim 7, wherein bicycle carrying platform comprises a bicycle placement plate, a front wheel-clamping structure and a rear wheel-clamping structure, and wherein the front wheel-clamping structure and the rear wheel-clamping structure are set in the bicycle placement plate.

9. The bicycle parking device of claim 8, wherein the storage tray is disk-shaped, and the bicycle parking spaces are distributed along the radial direction of the storage tray.

10. The bicycle parking device of claim 9, wherein in response to a user wanting to park a bicycle, the vacant bicycle carrying platform is placed on the rotary platform, the lifting mechanism is raised to the ground, the bicycle is placed on the bicycle carrying platform, the bicycle carrying platform carrying the bicycle is lowered to the storage tray by the lifting mechanism, the rotary platform is rotated to dock with the corresponding vacant bicycle parking space, and the bicycle carrying platform on the rotary platform is pushed into the bicycle parking space, and wherein in response to a user taking a bicycle, the bicycle carrying platform carrying the bicycle is brought into the rotary platform, and the bicycle is transported to the ground by the lifting mechanism.

11. A system comprising:
a storage tray located at the bottom of the bicycle parking device, and has a plurality of bicycle parking spaces;
a lifting mechanism that drives a bicycle carrying platform to move up and down;
the bicycle carrying platform comprises a front wheel-clamping structure, a rear wheel-clamping structure, and an electronic lock, the rear wheel-clamping structure comprising two restraining walls that restrain a rear bicycle tire from latitudinal movement and the electronic lock locking up the bicycle, wherein the two restraining walls are made of a magnetic material;
a controller connected to the electronic lock that detects the state of the electronic lock and user data, and comprises a wireless transmission module, the wireless transmission module sends data to a backend process computer system, and the backend process computer system calculates billable hours based on the data;
a rotary platform that is rotatably disposed on the lifting mechanism, and is docked with the bicycle parking space, the rotary platform comprises a rotating plate, a translation screw, a push block, a supporting plate and a guide board, wherein the translation screw, the push block and the supporting plate are installed on the rotating plate, the translation screw is threaded through a threaded translation hole of the push block, the guide board is set on the both sides of the rotating plate, the supporting plate coordinates with the bicycle carrying platform, the supporting plate is attached to the guide board, and is located at the both sides of the push block, and the translation screw rotates moving the push block, and wherein the push block comprises two mating groves that each receive a restraining wall, an electromagnet is embedded within each mating grove, wherein each electromagnet attracts the corresponding restraining wall and forms a detachable connection between interior sides of the mating grove and the restraining wall when powered on to form a detachable connection, the translation screw rotates to move the push block to pull the bicycle carrying platform onto the rotary platform; and
wherein the bicycle carrying platform transfers between the bicycle parking space and the rotary platform.

12. The system of claim 11, wherein the electromagnet exerts a force in the range of 150 to 250 N.

13. The system of claim 11, where detachable connection ends when power to the electromagnet is cut.

14. The system of claim 11, wherein each mating grove 1-3-1 may has a depth of 5 to 15 centimeters.

15. The system of claim 11, wherein the lifting mechanism includes a first lifting screw, a second lifting screw and a lifting platform, the first lifting screw and the second lifting screw are vertical set, both sides of the lifting platform respectively match up the first lifting screw and the second lifting screw, and in response to the first lifting screw and the second lifting screw rotating, the first lifting screw and the second lifting screw drive the lifting platform up and down.

16. The system of claim 15, wherein a central part of the storage tray has an installation position, and the lifting mechanism is set at the installation position, and the lifting channel of the lifting mechanism is formed in the vertical direction of the installation position.

17. The system of claim 16, wherein a guide limit rail forms the bicycle parking space, the guide limit rail guides the bicycle carrying platform in and out of and limits the bicycle carrying platform.

18. The system of claim 17, wherein bicycle carrying platform comprises a bicycle placement plate, a front wheel-clamping structure and a rear wheel-clamping structure, and wherein the front wheel-clamping structure and the rear wheel-clamping structure are set in the bicycle placement plate.

19. The system of claim 18, wherein the storage tray is disk-shaped, and the bicycle parking spaces are distributed along the radial direction of the storage tray.

20. The system of claim 19, wherein in response to a user wanting to park a bicycle, the vacant bicycle carrying platform is placed on the rotary platform, the lifting mechanism is raised to the ground, the bicycle is placed on the bicycle carrying platform, the bicycle carrying platform carrying the bicycle is lowered to the storage tray by the lifting mechanism, the rotary platform is rotated to dock with the corresponding vacant bicycle parking space, and the bicycle carrying platform on the rotary platform is pushed into the bicycle parking space, and wherein in response to a user taking a bicycle, the bicycle carrying platform carrying the bicycle is brought into the rotary platform, and the bicycle is transported to the ground by the lifting mechanism.

* * * * *